(12) United States Patent
Chen

(10) Patent No.: US 12,248,158 B2
(45) Date of Patent: Mar. 11, 2025

(54) MULTILAYER OPTICAL FILM STRUCTURE AND METHOD OF MANUFACTURING THE SAME

(71) Applicant: YTDIAMOND CO., LTD., Taoyuan (TW)

(72) Inventor: Ying-Tung Chen, Taoyuan (TW)

(73) Assignee: YTDIAMOND CO., LTD., Taoyuan (TW)

( * ) Notice: Subject to any disclaimer, the term of this patent is extended or adjusted under 35 U.S.C. 154(b) by 134 days.

(21) Appl. No.: 18/113,693

(22) Filed: Feb. 24, 2023

(65) Prior Publication Data

US 2023/0305198 A1    Sep. 28, 2023

(30) Foreign Application Priority Data

Mar. 24, 2022    (TW) .................................. 111110977

(51) Int. Cl.
*B32B 3/30*    (2006.01)
*B32B 7/023*    (2019.01)
(Continued)

(52) U.S. Cl.
CPC .............. *G02B 5/0268* (2013.01); *B32B 3/30* (2013.01); *B32B 7/023* (2019.01); *F21V 5/002* (2013.01); *B32B 7/12* (2013.01); *B32B 27/302* (2013.01); *B32B 27/304* (2013.01); *B32B 27/32* (2013.01); *B32B 27/36* (2013.01); *B32B 27/365* (2013.01); *B32B 27/40* (2013.01); *B32B 2307/418* (2013.01); *F21Y 2115/10* (2016.08)

(58) Field of Classification Search
CPC ............ B32B 2307/418; B32B 27/302; B32B 27/304; B32B 27/32; B32B 27/36; B32B 27/365; B32B 27/40; B32B 3/30; B32B 7/023; B32B 7/12; F21V 5/002; F21Y 2115/10; G02B 5/0268
See application file for complete search history.

(56) References Cited

U.S. PATENT DOCUMENTS

2016/0172631 A1    6/2016  Yamada et al.
2021/0088712 A1*   3/2021  Cheng ................. G02B 6/0068

FOREIGN PATENT DOCUMENTS

CN    105409327 A    3/2016
CN    107831562 A    3/2018
(Continued)

*Primary Examiner* — Lawrence D Ferguson
(74) *Attorney, Agent, or Firm* — Li & Cai Intellectual Property (USA) Office

(57) ABSTRACT

A multilayer optical film structure and a method of manufacturing the same are provided. The multilayer optical film structure includes a base layer, a first optical structure and a second optical structure. The base layer has a first surface and a second surface. The first optical structure is disposed on the first surface of the base layer. The second optical structure is disposed on the second surface of the base layer, and includes a first structural layer, a second structural layer and a third structural layer. The first structural layer is located between the base layer and the second structural layer, and the second structural layer is located between the first structural layer and the third structural layer. The difference between the refractive index of the first structural layer and the refractive index of the second structural layer is greater than or equal to 0.1.

6 Claims, 7 Drawing Sheets

(51) Int. Cl.
*F21V 5/00* (2018.01)
*G02B 5/02* (2006.01)
*B32B 7/12* (2006.01)
*B32B 27/30* (2006.01)
*B32B 27/32* (2006.01)
*B32B 27/36* (2006.01)
*B32B 27/40* (2006.01)
*F21Y 115/10* (2016.01)

(56) References Cited

FOREIGN PATENT DOCUMENTS

| | | |
|---|---|---|
| CN | 208188386 U | 12/2018 |
| TW | 201015159 A | 4/2010 |
| TW | 201937216 A | 9/2019 |

\* cited by examiner

MULTILAYER OPTICAL FILM STRUCTURE AND METHOD OF MANUFACTURING THE SAME

CROSS-REFERENCE TO RELATED PATENT APPLICATION

This application claims the benefit of priority to Taiwan Patent Application No. 111110977, filed on Mar. 24, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an optical film structure and a method of manufacturing the same, and more particularly to a multilayer optical film structure and a method of manufacturing the same.

BACKGROUND OF THE DISCLOSURE

In the related art, backlight modules have been widely used in liquid crystal display devices to provide light sources required for displaying images. The light-emitting assembly in the backlight module usually includes a plurality of light-emitting diodes (LEDs) or sub-millimeter light-emitting diodes (mini LEDs) arranged in an array, and the light beams generated by the light-emitting assembly are concentrated and have high directivity.

Therefore, in order to convert a point light source array generated by the light-emitting assembly into a surface light source, the optical assembly usually needs to use more optical films, such as light guide films, diffusers, or brightness enhancement films, and to use physical phenomena such as light refraction, reflection or scattering to diffuse the light beam generated by the light-emitting assembly to the entire display area. However, this method cannot balance the thickness and brightness uniformity of the optical assembly. Therefore, how to improve the diffusion effect of the optical film structure by improving the structural design to overcome the above-mentioned defects has become one of the important issues to be solved in this field.

SUMMARY OF THE DISCLOSURE

In response to the above-referenced technical inadequacy, the present disclosure provides a multilayer optical film structure and a method of manufacturing the same. The optical film structure provided by the present disclosure is a multi-layer structure with a specific arrangement of structure and refractive index, which has a good diffusion effect for point light sources and can be used in a light-emitting module of a display device.

In order to solve the above-mentioned problems, one of the technical aspects adopted by the present disclosure is to provide a multilayer optical film structure, which includes a base layer, a first optical structure and a second optical structure. The base layer has a first surface and a second surface opposite to the first surface. The first optical structure is disposed on the first surface of the base layer. The second optical structure is disposed on the second surface of the base layer, and includes a first structural layer, a second structural layer and a third structural layer, in which the first structural layer is located between the base layer and the second structural layer, and the second structural layer is located between the first structural layer and the third structural layer. The difference between a refractive index of the first structural layer and a refractive index of the second structural layer is greater than or equal to 0.1.

In order to solve the above-mentioned problems, another one of the technical aspects adopted by the present disclosure is to provide a method of manufacturing the multilayer optical film structure, which includes forming the base layer; forming the first optical layer on the first surface of the base layer; and forming the first structural layer on the second surface of the base layer; forming the second structural layer on the first structural layer. More particularly, the third structural layer is configured to be optionally formed on the second structural layer according to the thickness requirement of the multilayer optical film structure after the step of forming the first structural layer on the second surface of the base layer.

In order to solve the above-mentioned problems, another one of the technical aspects adopted by the present disclosure is to provide a method of manufacturing the multilayer optical film structure, which includes forming the base layer; forming the first structural layer on the second surface of the base layer; and forming the first optical layer on the first surface of the base layer; forming the second structural layer on the first structural layer. More particularly, the third structural layer is configured to be optionally formed on the second structural layer according to the thickness requirement of the multilayer optical film structure after the step of forming the second structural layer on the first structural layer.

In order to solve the above-mentioned problems, another one of the technical aspects adopted by the present disclosure is to provide a method of manufacturing the multilayer optical film structure, which includes forming the base layer; forming the first structural layer on the second surface of the base layer; forming the second structural layer on the first structural layer; and forming the first optical layer on the first surface of the base layer. More particularly, the third structural layer is configured to be optionally formed on the second structural layer according to the thickness requirement of the multilayer optical film structure after the step of forming the first optical layer on the first surface of the base layer.

In order to solve the above-mentioned problems, another one of the technical aspects adopted by the present disclosure is to provide a method of manufacturing the multilayer optical film structure, which includes: forming the base layer; forming the first structural layer on the second surface of the base layer; forming the second structural layer on the first structural layer; forming the third structural layer on the second structural layer; and forming the first optical layer on the first surface of the base layer.

Therefore, one of the beneficial effects of the present disclosure is that the multilayer optical film structure and the manufacturing method thereof provided by the present disclosure can diffuse the light beam generated by the light-emitting assembly by virtue of "the first optical structure being arranged on the first surface of the base layer, and the second optical structure being arranged on the first surface of the base layer," "the second optical structure including a first structural layer, a second structural layer and a third structural layer", "the first structural layer being located between the base layer and the second structural layer, and the second structural layer being located between the structural layer and the third structural layer" and "the difference between the refractive index of the first structural layer and the second structural layer is greater than or equal to 0.1."

These and other aspects of the present disclosure can become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
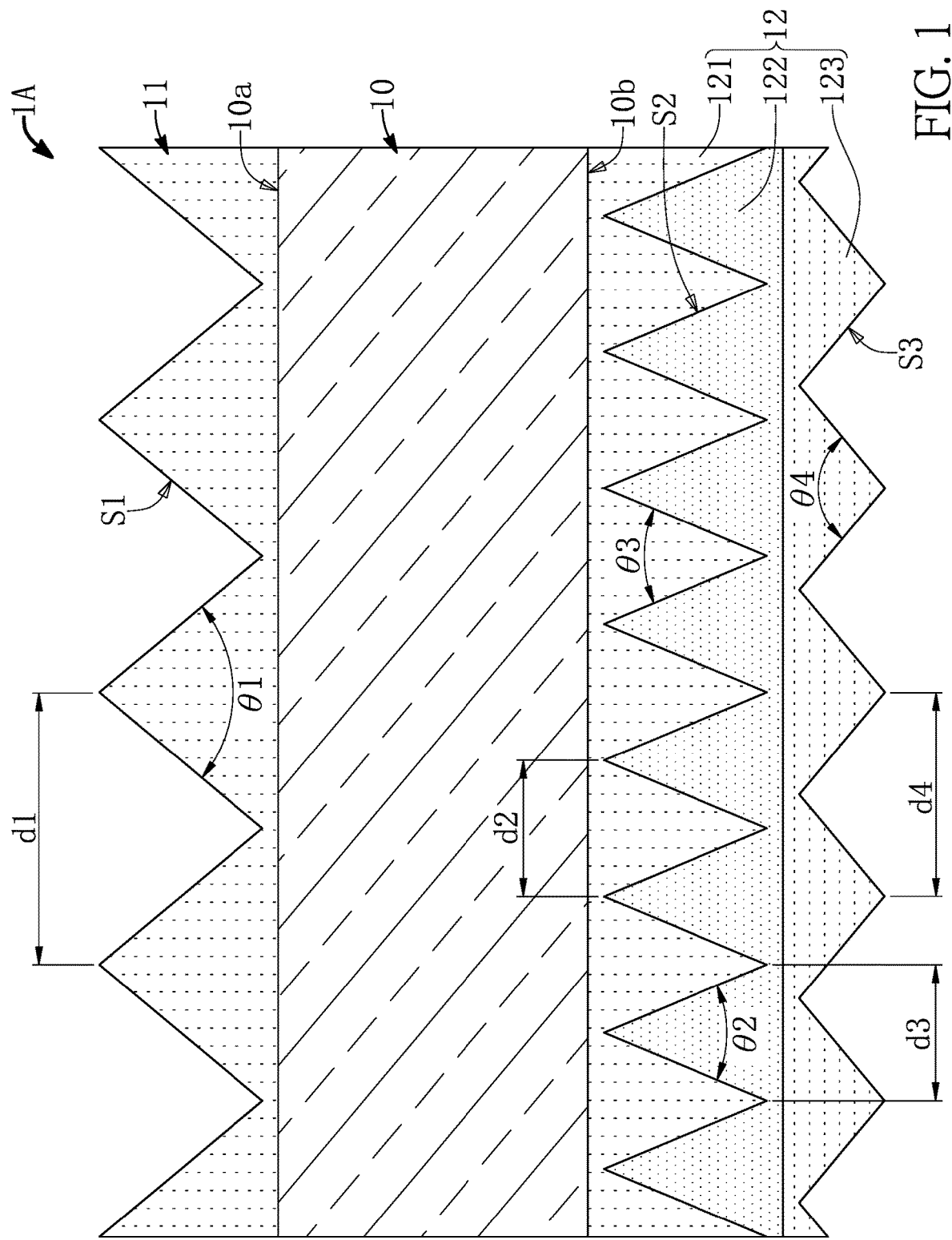
FIG. 1 is a schematic view of a first embodiment of the present disclosure.

The present disclosure is more particularly described in the following examples that are intended as illustrative only since numerous modifications and variations therein can be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1, FIG. 1 is a schematic view of the first embodiment of the present disclosure, the first embodiment of the present disclosure provides a multilayer optical film structure 1A, which includes a base layer 10, a first optical structure 11 and a second optical structure 12. The multilayer optical film structure 1A of the present disclosure can be directly or indirectly disposed on the light-emitting assembly to uniformly (or evenly) diffuse the light beam generated by the light-emitting assembly. Furthermore, the optical film 1A can be used as a diffusion sheet or a brightness enhancement sheet to convert a point light source or a linear light source into a surface light source. In one embodiment, the total thickness of the multilayer optical film 1A may be 40 μm to 300 μm.

Furthermore, the base layer 10 has a first surface 10a and a second surface 10b opposite to the first surface 10a. The optical film 1A has a light input side (or a light incident surface) and a light output side (or a light-emitting surface) opposite to the light input side. In this embodiment, the first surface 10a of the base layer 10 faces the light output side, and the second surface 10b of the base layer 10 faces the light input side. In addition, the first optical structure 11 is disposed on the first surface 10a and located on the light output side of the base layer 10. Therefore, the first optical structure 11 has a light output surface facing away from the light-emitting assembly. In this embodiment, the thickness of the first optical structure 11 ranges from 5 μm to 50 μm. The refractive index of the first optical structure 11 is preferably 1.42 to 1.70. In this embodiment, the first optical structure 11 can be a concave pyramid or a convex pyramid.

The material constituting the base layer 10 can be polyethylene terephthalate (polyethylene terephthalate, PET), polystyrene (PS), polycarbonate (PC), polyurethane (PU), polypropylene (PP), polyvinylchloride (PVC), acrylic (PMMA), acrylic (MMA), etc. As long as the material constituting the base layer 10 allows light beams to pass through, the present disclosure is not limited thereto. In addition, the thickness of the base layer 10 may be 30 μm to 250 μm, preferably 50 μm to 125 μm, which is easier to process. For example, the refractive index of the base layer 10 may be 1.50 to 1.60.

In addition, the optical film 1A further includes a second optical structure 12 disposed on the second surface 10b of the base layer 10 and on the light input side of the optical film 1A. That is to say, the first optical structure 11 is disposed on the light output side of the base layer 10, and the second optical structure 12 is disposed on the light input side of the base layer 10.

In this embodiment, the second optical structure 12 includes a first structural layer 121, a second structural layer 122 and a third structural layer 123. In detail, the first structural layer 121 is located between the base layer 10 and the second structural layer 122, and the second structural layer 122 is located between the first structural layer 121 and the third structural layer 123. That is to say, when the second optical structure 12 is disposed on the light input side of the base layer 10, the first structural layer 121 is closest to the base layer 10, and the third structural layer 123 is farthest away from the base layer 10.

Accordingly, when the optical film 1A is disposed on the light-emitting assembly, the third structural layer 123 has a light input surface facing the light-emitting assembly. That is to say, the light beams generated by the multiple light-emitting units of the light-emitting assembly can enter the optical film 1A through the light input surface of the third structural layer 123, and then pass through the second structural layer 122, the first structural layer 121, the base layer 10, and are emitted outside from the light output surface of the first optical structure 11.

Furthermore, the surface of the first optical structure 11 includes a plurality of first inclined surfaces S1, and every two connected first inclined surfaces S1 jointly form a first included angle θ1. In addition, in the second optical structure 12, the interface between the first structural layer 121 and the second structural layer 122 includes a plurality of second inclined surfaces S2, and each second inclined surface S2 is inclined relative to the thickness direction of the base layer 10. In this embodiment, every two connected second inclined surfaces S2 jointly form a second included angle θ2 (or a third included angle θ3). The surface of the third structural layer 123 includes a plurality of third inclined surfaces S3, and every two connected third inclined surfaces S3 jointly form a fourth angle θ4.

In other words, the first optical structure 11 has a plurality of first sharp corners each having an angle θ1, the first structural layer 121 has a plurality of second sharp corners each having an angle θ2, and the second structural layer 122 has a plurality of third sharp corners each having an angle θ3, and the third structural layer 123 has a plurality of fourth sharp corners each having an angle θ4. In this embodiment, the angle θ1 of the first sharp corner is larger than the angle θ2 of the second sharp corner, the angle θ3 of the third sharp corner and the angle θ4 of the fourth sharp corner. For example, the angle θ1 of the first sharp corner is 70 to 100 degrees, preferably 90 degrees, so as to facilitate the total reflection of the light beam. The angle θ2 of the second sharp corner, the third θ3 of the third sharp corner and the angle θ4 of the fourth sharp corner are 40 to 60 degrees, preferably 50 degrees.

On the other hand, a distance d1 is defined between two adjacent ones of the first sharp corners, a distance d2 is defined between two adjacent ones of the second sharp corners, a distance d3 is defined between two adjacent ones of the third sharp corners, and a distance d4 is defined between two adjacent ones of the fourth sharp corners. In this embodiment, the distance d1 is greater than the distance d2, the distance d3 and the distance d4.

It should be noted that the surface profile of the first structural layer 121 and the surface profile of the second structural layer 122 can match each other. The first structural layer 121 has a plurality of microstructures, and each microstructure can be a triangular prism, a trapezoidal prism, an arched prism, a convex pyramid, a concave pyramid or other pyramids, in which the concave pyramid structure can be a three-sided concave pyramid structure or a four-sided concave pyramid structure, and the convex pyramid structure may be a three-sided convex pyramid structure or a four-sided convex pyramid structure, but the present disclosure is not limited thereto.

In this embodiment, the first structural layer 121 has a plurality of recessed microstructures 121A, and the second structural layer 122 fills the plurality of recessed microstructures 121A and has a light input surface 122S. In detail, the first structural layer 121 having the plurality of recessed microstructures 121A can be manufactured in advance, and then a glue material is filled into the plurality of recessed microstructures 121A to form the second structural layer 122. Therefore, the second structural layer 122 has a plurality of convex microstructures 122A.

Figure 2:
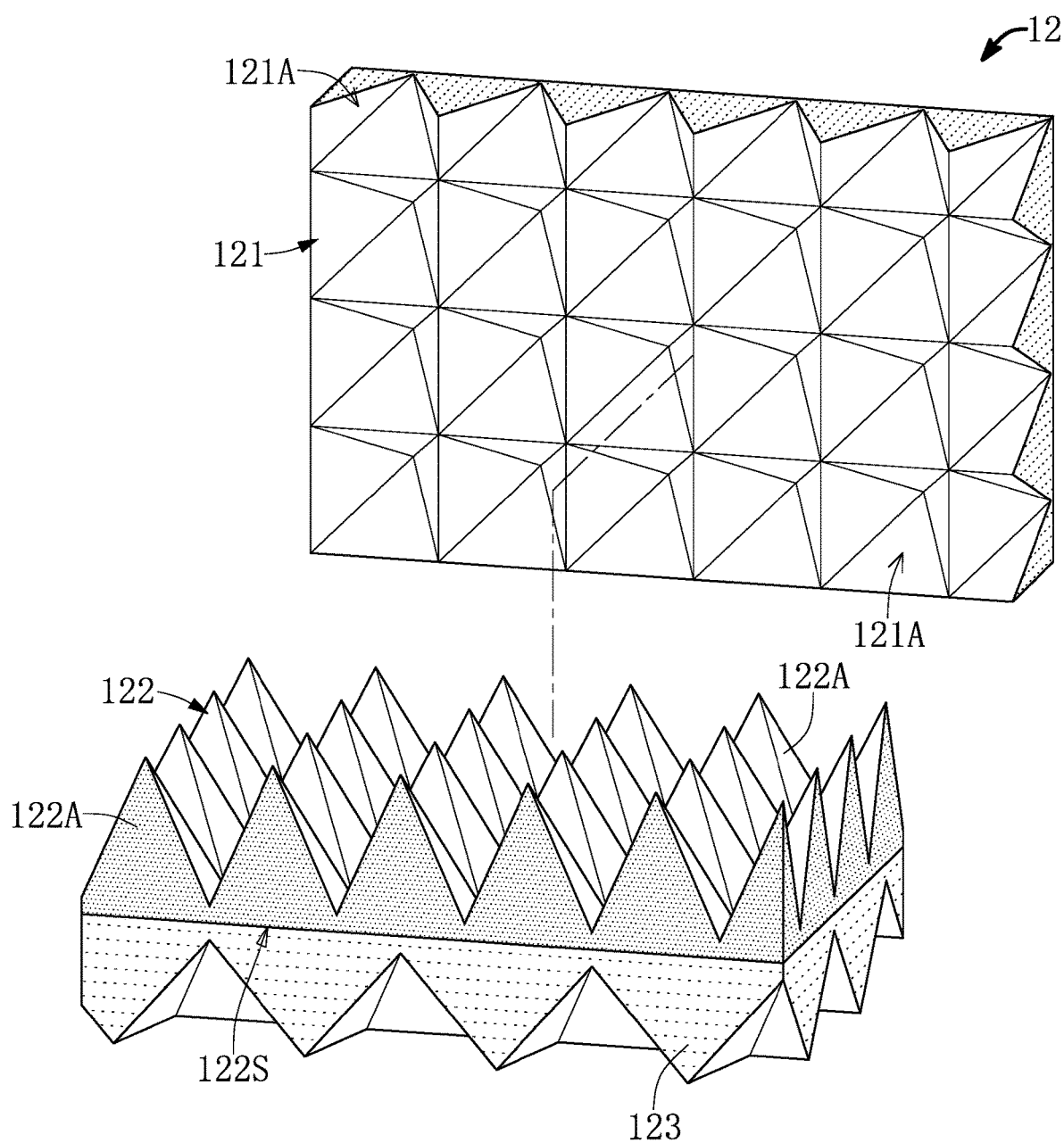
FIG. 2 is a partial perspective exploded view of the optical film according to an embodiment of the present disclosure.

Referring to FIG. 2, which is a partial perspective exploded view of an optical film according to an embodiment of the present disclosure. In this embodiment, the second optical structure 12 has a plurality of concave microstructures 121A, and the concave microstructures 121A are concave toward the direction facing the base layer 10. The concave microstructure 121A is a concave pyramid microstructure, and the convex microstructure 122A is a convex pyramid microstructure. The concave microstructure 121A may include four interconnected triangular inclined surfaces, and the four triangular inclined surfaces can be connected with each other so that the concave microstructure 121A has a concave space with an opening (or a closed opening), which is helpful to make the light beam entering the second optical structure 12 be reflected and refracted more times. In another embodiment, each concave microstructure 121A (or each convex microstructure 122A) may also have three triangular inclined surfaces, but the present disclosure is not limited thereto.

When the light beam generated by one of the light-emitting units enters the second optical structure 12, it can be transmitted laterally for a certain distance in the second optical structure 12 through multiple reflections and refractions, and then enters the base layer 10. In this way, the uniform light effect of the optical film 2A can be increased (such as providing a uniform brightness distribution).

Figure 3:
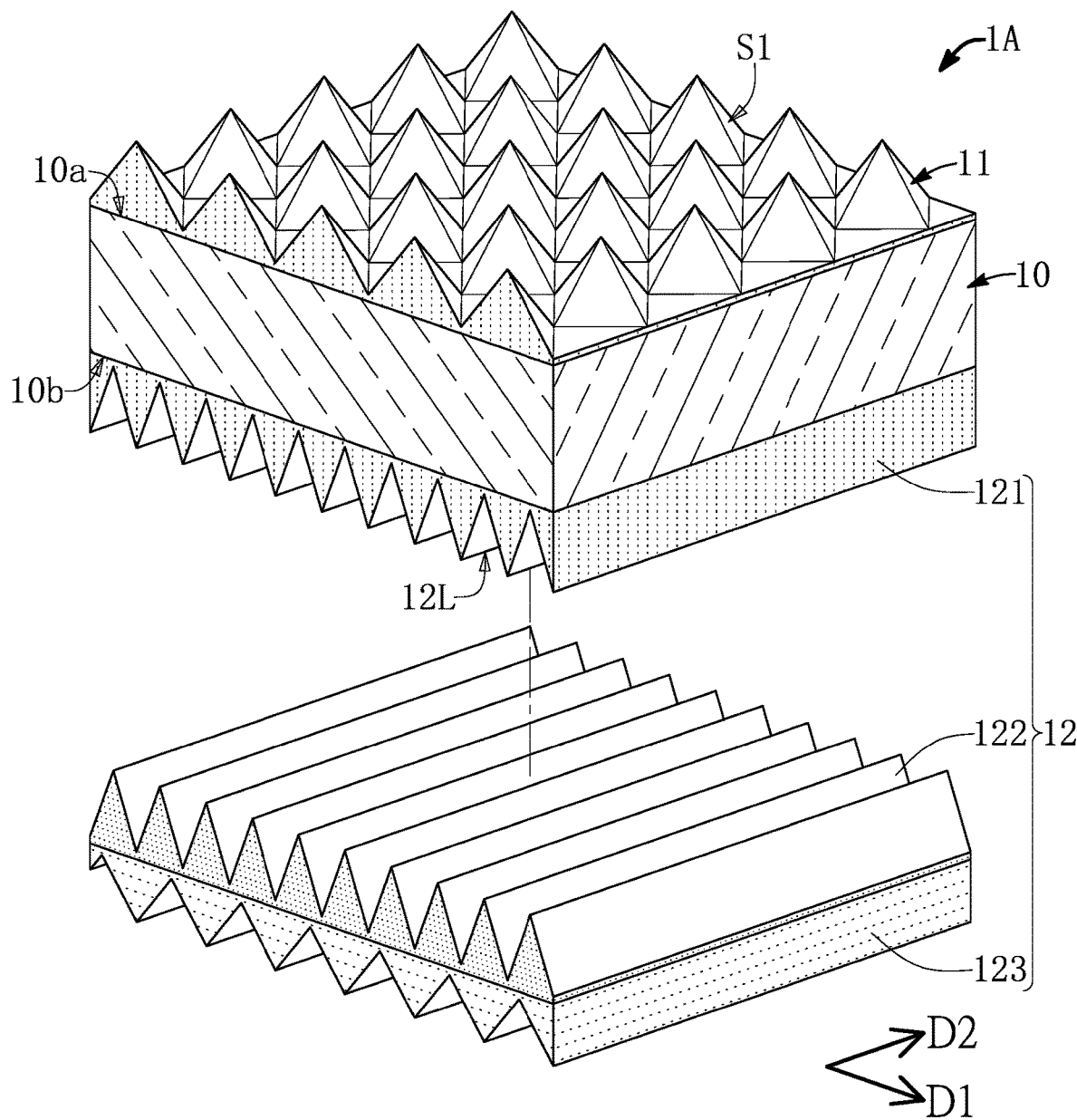
FIG. 3 is a partial perspective exploded view of the optical film according to another embodiment of the present disclosure.

Referring to FIG. 3, which is a partial perspective exploded view of an optical film according to another embodiment of the present disclosure. In the embodiment shown in FIG. 3, the first structural layer 121 includes a plurality of triangular prisms, each of the triangular prisms has a ridgeline 12L extending along the second direction D2. Corresponding to the first structural layer 121, the second structural layer 122 also includes a plurality of triangular prisms extending along the second direction D2. However, in yet another embodiment of the present disclosure, the ridgelines 12L of the plurality of triangular prisms of the first structural layer 121 and the ridgelines 12L of the plurality of triangular prisms of the second structural layer 122 may extend along the first direction D1. In this embodiment, the plurality of triangular prisms may have different widths and depths, for example, the width of the triangular prism may be 5 μm to 50 μm, and the depth of the triangular prism may be 5 μm to 50 μm.

It should be noted that when a light beam enters a medium with a lower refractive index from a medium with a higher refractive index, and the incident angle of the light beam is greater than the critical angle, the light beam can be totally reflected. Conversely, when a light beam enters a medium with a higher refractive index from a medium with a lower refractive index, the light beam cannot be totally reflected, but can be divided into a refracted light beam and a reflected light beam. In this embodiment, a high refractive index refers to a refractive index range between 1.50 and 1.70, and a low refractive index refers to a refractive index range between 1.40 and 1.50.

Therefore, in this embodiment, the refractive index of the first optical structure 11 can be as high as possible (better), preferably above 1.70. Specifically, the first optical structure 11 is a high refractive index layer, the first structural layer 121 is a low refractive index layer, and the second structural layer 122 and the third structural layer 123 can be combined into a high refractive index layer. In other words, the refractive index of the second structural layer 122 and the third structural layer 123 can be the same. It should be noted that the difference between the refractive index of the first structural layer 121 and the refractive index of the second structural layer 122 should be greater than or equal to 0.1 so as to achieve a good uniform light effect. If the difference between the refractive index of the first structural layer 121 and the refractive index of the second structural layer 122 is less than 0.1, the brightness cannot be uniformly distributed.

In this embodiment, the refractive index of the first structural layer 121 is smaller than the refractive indexes of the second structural layer 122 and the third structural layer 123. For example, the refractive index of the first optical structure 11 can be 1.63, the refractive index of the base layer can be 1.57, the refractive index of the first structural layer 121 can be 1.45, the refractive index of the second structural layer 12 can be 1.63, and the refractive index of the third structural layer 123 can be 1.63.

Second Embodiment

This embodiment is substantially the same as the first embodiment, and the differences are described as follows. In this embodiment, the first optical structure 11 and the second structural layer 122 are high refractive index layers, and the first structural layer 121 and the third structural layer 123 are combined into a low refractive index layer. In other words, the refractive index of the second structural layer 122 and the refractive index of the third structural layer 123 can be different. In this embodiment, the refractive index of the second structural layer 122 is greater than the refractive indexes of the first structural layer 121 and the third structural layer 123. For example, the refractive index of the first optical structure 11 can be 1.63, the refractive index of the base layer can be 1.57, the refractive index of the first structural layer 121 can be 1.45, the refractive index of the second structural layer 122 can be 1.63, and the refractive index of the third structural layer 123 can be 1.45.

For example, the material used for the high refractive index layer can contain zirconia particles, and the material used for the low refractive index layer can contain fluoride particles or silicon oxide particles. However, the above-mentioned example is only one possible embodiment and is not intended to limit the present disclosure.

Third Embodiment

This embodiment is substantially the same as the first embodiment, and the differences are described as follows. In this embodiment, the first optical structure 11, the first structural layer 121 and the third structural layer 123 are high refractive index layers, and the second structural layer 122 is a low refractive index layer. In this embodiment, the refractive index of the second structural layer 122 is smaller than the refractive indexes of the first structural layer 121 and the third structural layer 123. For example, the refractive index of the first optical structure 11 can be 1.63, the refractive index of the base layer can be 1.57, the refractive index of the first structural layer 121 can be 1.63, the refractive index of the second structural layer 122 can be 1.45, and the refractive index of the third structural layer 123 can be 1.63.

Fourth Embodiment

This embodiment is substantially the same as the first embodiment, and the differences are described as follows. In this embodiment, the first optical structure 11 and the first structural layer 121 are high refractive index layers, and the second structural layer 122 and the third structural layer 123 are low refractive index layers. In this embodiment, the refractive index of the first structural layer 121 is greater than the refractive indexes of the second structural layer 122 and the third structural layer 123. For example, the refractive index of the first optical structure 11 can be 1.63, the refractive index of the base layer can be 1.57, the refractive index of the first structural layer 121 can be 1.63, the refractive index of the second structural layer 12 can be 1.45, and the refractive index of the third structural layer 123 can be 1.45.

It should be noted that since the incident light is reflected by the first optical structure 11 and travels in the opposite direction, the light is reflected again by the second optical structure 12 and returns to the light output surface. Therefore, in the second optical structure 12 of the present disclosure, the refractive indexes of the first structural layer 121, the second structural layer 122 and the third structural layer 123 can be set oppositely, so that light distribution can be more uniform through multiple refraction, reflection or total reflection.

Regarding the above-mentioned first to fourth embodiments, referring to FIG. 4 to FIG. 7, the present disclosure provides a flowchart of a method of manufacturing an optical film.

Figure 4:
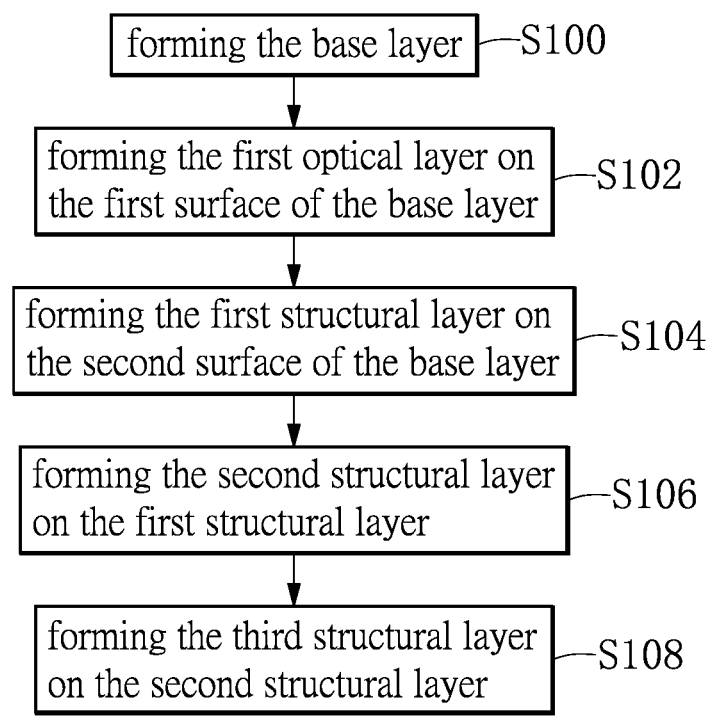
FIG. 4 is a flowchart of the method for manufacturing the optical film according to an embodiment of the present disclosure.

In one embodiment of the present disclosure, referring to FIG. 4, the present disclosure includes at least the following steps: forming the base layer 10 (S100); forming the first optical layer 11 on the first surface 10a of the base layer 10 (S102); forming the first structural layer 121 on the second surface 10b of the base layer 10 (S104); and forming the second structural layer 122 on the first structural layer 121 (S106). More particularly, the third structural layer 123 can be configured to be optionally formed on the second structural layer 122 (S108) according to the thickness requirement of the multilayer optical film structure after the step S106 of forming the second structural layer 122 on the first structural layer 121.

Figure 5:
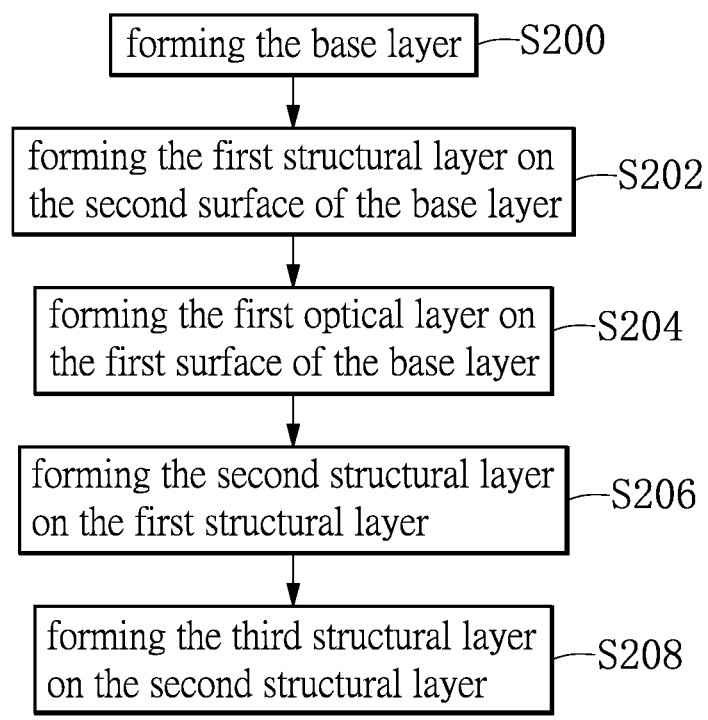
FIG. 5 is a flowchart of the method for manufacturing the optical film according to another embodiment of the present disclosure.

In another embodiment of the present disclosure, referring to FIG. 5, the present disclosure provides a flowchart of a method for manufacturing an optical film, which at least includes the following steps: forming the base layer 10 (S200); forming the first structural layer 121 on the second surface 10b of the base layer 10 (S202); forming the first optical layer 11 on the first surface 10a of the base layer 10 (S204); and forming the second structural layer 122 on the first structural layer 121 (S206). More particularly, the third structural layer 123 can be configured to be optionally formed on the second structural layer 122 (S208) according to the thickness requirement of the multilayer optical film structure after the step S206 of forming the second structural layer 122 on the first structural layer 121.

Figure 6:
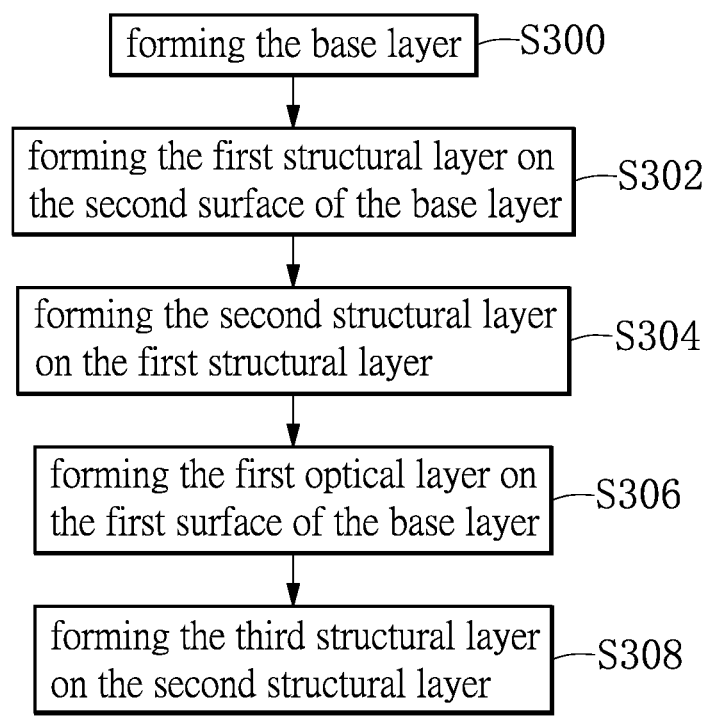
FIG. 6 is a flowchart of a method of manufacturing an optical film according to another embodiment of the present disclosure.

In yet another embodiment of the present disclosure, referring to FIG. 6, the present disclosure provides a flowchart of a method for manufacturing an optical film, which at least includes the following steps: forming the base layer 10 (S300); forming the first structural layer 121 on the second surface 10b of the base layer 10 (S302); forming the second structural layer 122 on the first structural layer 121 (S304); and forming the first optical layer 11 on the first surface 10a of the base layer 10 (S306). More particularly, the third structural layer 123 can be configured to be optionally formed on the second structural layer 122 (S308) according to the thickness requirement of the multilayer optical film structure after the step S306 of forming the first optical layer 11 on the first surface 10a of the base layer 10.

Figure 7:
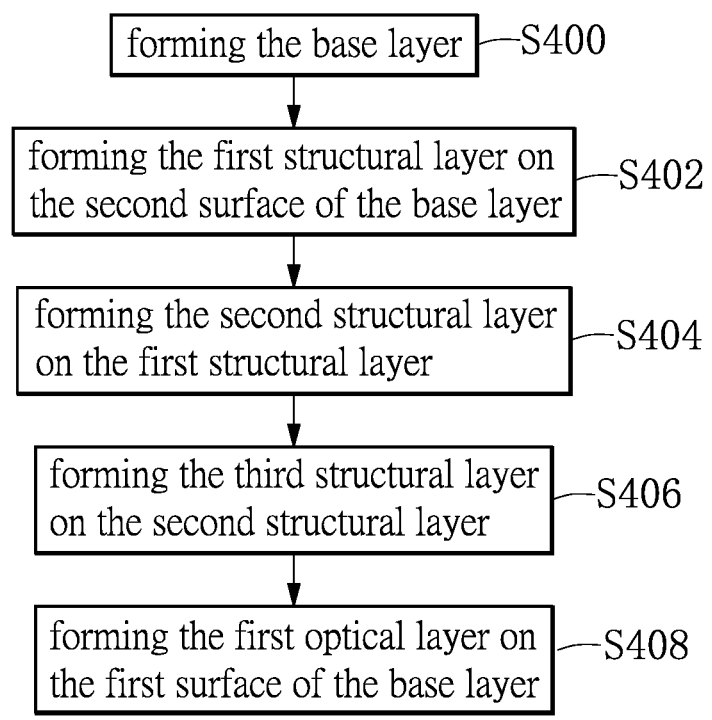
FIG. 7 is a flowchart of a method of manufacturing an optical film according to another embodiment of the present disclosure.

In another embodiment of the present disclosure, referring to FIG. 7, the present disclosure provides a flowchart of a method for manufacturing an optical film, which at least includes the following steps: forming the base layer 10 (S400); forming the first structural layer 121 on the second surface 10b of the base layer 10 (S402); forming the second structural layer 122 on the first structural layer 121 (S404); forming the third structural layer 123 on the second structural layer 122 (S406); and forming the first optical layer 11 on the first surface 10a of the base layer 10 (S408).

In the present disclosure, the optical film can be fabricated layer by layer by rolling (roll-to-roll) or molding. In addition, the base layer 10 can be made of polyethylene terephthalate (PET), polystyrene (PS), polycarbonate (PC), polyurethane (PU), polypropylene (PP), polyvinylchloride (PVC), acrylic (PMMA), acrylic (MMA), etc. However, as long as the material constituting the base layer 10 allows light beams to pass through, the present disclosure is not limited thereto. Considering subsequent processing and application, the thickness of the base layer 10 may be 30 μm to 250 μm, preferably 50 μm to 125 μm.

It should be noted that, from a side view, the first optical structure 121 has a plurality of first sharp corners, the first structural layer 121 has a plurality of second sharp corners, and the second structural layer 122 has a plurality of third sharp corners, and the third structural layer 123 has a plurality of fourth sharp corners. Furthermore, the first sharp corner has an angle θ1, the second sharp corner has an angle θ2, the third sharp corner has an angle θ3, and the fourth sharp corner has an angle θ4. In an embodiment of the present disclosure, the angle θ1 of the first sharp corner is larger than the angle θ2 of the second angle, the angle θ3 of the third angle and the angle θ4 of the fourth sharp corner.

Specifically, the angle θ1 of the first sharp corner can be set at 70 to 100 degrees, preferably 90 degrees. The angle θ2 of the second sharp corner can be set at 40 to 60 degrees, preferably 50 degrees. The angle θ3 of the third sharp corner can be set at 40 to 60 degrees, preferably 50 degrees. The angle θ4 of the fourth sharp corner can be set to be 40 to 60 degrees, preferably 50 degrees.

Beneficial Effects of the Embodiments

In conclusion, one of the beneficial effects of the present disclosure is that the multilayer optical film structure and the manufacturing method thereof provided by the present disclosure can diffuse the light beam generated by the light-emitting assembly by virtue of "the first optical structure being arranged on the first surface of the base layer, and the second optical structure being arranged on the first surface of the base layer," "the second optical structure including a first structural layer, a second structural layer and a third structural layer", "the first structural layer being located between the base layer and the second structural layer, and the second structural layer being located between the structural layer and the third structural layer" and "the difference between the refractive index of the first structural layer and the second structural layer is greater than or equal to 0.1."

Furthermore, by setting the angle θ4 of the fourth sharp corner close to 50 degrees, the probability of total reflection of the light beam generated by the light-emitting unit when the light beam is projected on the third inclined surface S3 for the first time can be greatly increased, thereby improving diffusion effect.

Compared with the prior backlight module, the multilayer optical film structure of the embodiment of the present disclosure can output diffused point light sources through the arrangement of structural layers. Accordingly, the multilayer optical film structure of the present disclosure can replace the conventional way of additionally using a diffusion sheet and a brightness enhancement sheet. Even if the number of optical films in the optical component is reduced, it can still have a uniform brightness distribution in the display area. In this way, the total thickness of the optical assembly and the size of the display device can be further reduced.

In addition, the second optical layer of the multilayer optical film structure of the present disclosure can be composed of a three-layer structural layer, even if there is no diffusing structure inside the first optical structure (or the second optical structure), it can increase the refraction, reflection and scattering of light beams so as to achieve the light-diffusing effect of the light beam.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments can become apparent to those skilled in the art to which the present disclosure pertains without departing from its spirit and scope.

What is claimed is:

1. A multilayer optical film structure, comprising:
a base layer having a first surface and a second surface opposite to the first surface;
a first optical structure disposed on the first surface of the base layer; and
a second optical structure disposed on the second surface of the base layer, and including a first structural layer, a second structural layer and a third structural layer, wherein the first structural layer is located between the base layer and the second structural layer, and the second structural layer is located between the first structural layer and the third structural layer;
wherein a difference between a refractive index of the first structural layer and a refractive index of the second structural layer is greater than or equal to 0.1;
wherein the first optical structure has a plurality of first sharp corners, the first structural layer has a plurality of second sharp corners, the second structural layer has a plurality of third sharp corners, and the third structural layer has a plurality of fourth sharp corners;
wherein an angle of the first sharp corner is larger than an angle of the second sharp corner, an angle of the third sharp corner and an angle of the fourth sharp corner.

2. The multilayer optical film structure according to claim 1, wherein the first structural layer and the second structural layer include a pyramid structure or a triangular prism structure.

3. The multilayer optical film structure according to claim 2, wherein the pyramid structure is a three-sided concave pyramid structure or a four-sided concave pyramid structure.

4. The multilayer optical film structure according to claim 2, wherein the pyramid structure is a three-sided convex pyramid structure or a four-sided convex pyramid structure.

5. The multilayer optical film structure according to claim 1, wherein the angle of the first sharp corner ranges from 70 to 100 degrees.

6. The multilayer optical film structure according to claim 1, wherein the angle of the second sharp corner, the angle of the third sharp corner and the angle of the fourth sharp corner range from 40 to 60 degrees.

* * * * *